United States Patent [19]

Matsumoto et al.

[11] Patent Number: 5,722,695
[45] Date of Patent: Mar. 3, 1998

[54] PIPE JOINT

[75] Inventors: Shigeyuki Matsumoto; Yasuo Yabe; Kenji Fuse; Yasuyoshi Maruhashi; Mitsuaki Motoda; Kenji Miyatani; Tsuneyoshi Shibata; Masao Kanazawa; Minoru Sunaga; Nobuhisa Fukuda, all of Tokyo, Japan

[73] Assignee: Kenkan Corporation, Tokyo, Japan

[21] Appl. No.: 699,252

[22] Filed: Aug. 19, 1996

[30] Foreign Application Priority Data

Sep. 13, 1995 [JP] Japan .................................. 7-260713

[51] Int. Cl.$^6$ .................................................. F16L 55/00
[52] U.S. Cl. .......................... 285/23; 285/39; 285/112; 285/415
[58] Field of Search ............................. 285/112, 233, 285/234, 415, 416, 177, 23, 39

[56] References Cited

U.S. PATENT DOCUMENTS

| | | | |
|---|---|---|---|
| 944,877 | 12/1909 | Koschinski | 285/415 X |
| 3,405,957 | 10/1968 | Chakroff | 285/233 X |
| 4,150,847 | 4/1979 | DeLanzo | 285/233 X |
| 4,662,656 | 5/1987 | Douglas | 285/112 X |
| 4,822,077 | 4/1989 | Hendrickson | 285/177 X |
| 5,310,223 | 5/1994 | Straub | 285/112 |

*Primary Examiner*—Dave W. Arola
*Attorney, Agent, or Firm*—Eric P. Schellin

[57] ABSTRACT

A pipe joint for connecting water supply pipe together and which utilizes compression seals between the pipe and the joint, and is comprised of a holding housing having a band body that surround a seal ring and a holding ring. A locking bolt is threadably tightened onto the holding housing.

The seal ring is embedded and sealed within outside surface of both ends of the separated pipes after the locking bolt is threadably tightened.

The holding ring is positioned to engage and become fully engaged within the groove at each of outside of the separated pipes, and hold the separation pipes against being easily separated after the locking bolt is threadably tight-end onto the holding housing.

The ring spring having a turned up portion eliminate swell out of the holding ring from the holding housing, and circumference rotation by itself.

The ring expander creatable enlargement of circumference clearance between adjacent segment of the holding ring allowed the diameter enlargement of the holding ring against compress force of the ring spring.

The setting member maintainable diameter enlargement of the holding ring after removal of the ring expander is at ease of prior to installing of the pipe joint for connecting the separated pipes.

3 Claims, 13 Drawing Sheets

PIPE JOINT

BACKGROUND OF THE INVENTION

1. Field of the Invention

This invention relates generally to pipe joints for connecting water supply pipe together and, in particular, to an improved pipe joint which prevents a fluid leakage and a separation of water supply pipe.

2. Description of the Prior Art

As shown in FIGS. 13–15, in a prior art pipe joint, a seal ring 2 that is provided on inside of a joint half housing 2, 3 seals between the ends of separated pipe 1, 1, an inner rims 5, 5 of the joint half housing 3, 3 is being engaged into a groove 6, 6 formed at each end surfaces of separated pipe 1, 1.

The joint half housing 3, 3 is becoming on unity of housing to combine each others by the tightening of the bolts and nuts 4, 4.

As shown in FIG. 15B, the seal ring 2 is generally C-shaped in cross section and formed of a rubber, and has a flexible lip portion 2a at each end thereof, each of which is embedded and sealed within the outside surfaces of both ends of separated pipes 1, 1.

As shown in FIGS. 15A and 15B, the seal ring 2 has an inside diameter which is less dimension than an outside diameter of separated pipe 1, 1 to keep close tightly for a fluid leakage in the pipe joint.

Notwithstanding, disadvantage of prior art pipe joint is the inability easily inserting of the seal ring on the outside surface of both ends of separated pipes.

If during the fitting of the pipe joint to separated pipes, each joint half housing to be removed by removing of the bolts and nuts before the seal ring being to engage on both end of separated pipes; since a bolts and nuts is used for combination of the joint half housing, a lost bolts and nuts is caused by a poor working conditions at limited work spaces, this encounters unnecessary expense.

A correct placing and alignment of the inner rims of the joint half housing into the groove at both end surfaces of separated pipes is required for connecting the separated pipe together.

This is particularly a problem that the joint does not have itself the ability to recognize a correct alignment of the joint with separated pipes, that have this low reliability.

If during the fitting of the pipe joint to separated pipes, the seal ring may be embedded and sealed on outside surfaces of both ends of separated pipes, which fluid passing through the pipe joint is sealed without operator awareness, because an inside diameter of the seal ring is smaller dimension than the outside diameter of separated pipe 1, 1. However, this could cause the fluid leakage between the seal ring and the ends of separated pipe under normal water working pressure condition because of its lack of compression force of the seal ring within the joint housing.

Another form of prior art pipe joint is described in Japanese patent Publication No. 55-25316 of 1980.

According to this apparatus, differing from that using the conventional pipe joint type, portion of the seal gasket having grip members in the joint housing, and which is particularly suited for use in connecting together pipes to more securely grip at each end smooth surfaces of separated pipe.

SUMMARY OF THE INVENTION

The present invention contemplates an improvement in the construction of the pipe joint which is particularly suited for use in connecting together metallic pipes to more securely seal and hold the pipes against being easily separated.

More specifically, the present invention aims to accomplish the foregoing by a novel adoption of a joint to use in connecting together separated pipes so that the joint may be used as a pipe joint to connect together pipe of same sizes and materials.

This is accomplished in the present invention to provide with unique parts particularly designed to securely seal and to connect the separated pipes. Specifically, this is done without having to combine any of the joint half housing components of the prior pipe joint. The result is the pipe joint which provide easily correct embedding of the seal ring within the outer surface of the pipes and a saving in unnecessary expense and is secured in strength against being pulled apart only by the strength of its connection to the separated pipes.

The construction of the present pipe joint is such that the ring spring keep the holding ring, and swell out and circumference rotation encountered while connecting separated pipe are entirely eliminated.

The present pipe joint, the ring expander produce enlarged circumference clearance between adjacent segment of the holding ring, such the holding ring while connecting separated pipe are at ease of operation.

With the present pipe joint, the setting member is maintained the diameter enlargement of the holding ring after removal of the ring expander, and easy to use.

Of additional advantage is that the unique construction of the pipe joint of the present invention enables it to be allowed to easily recognize the correct alignment between the pipe joint and the separated pipes. Thus, for example, the pipe joint may be used in preventing the fluid leakage without operator awareness.

The foregoing and other advantages of the present invention will become more apparent from the following description of the preferred embodiment when taken in conjunction with the accompanying drawings.

DETAILED DESCRIPTION OF PREFERRED EMBODIMENTS

Figure 1:
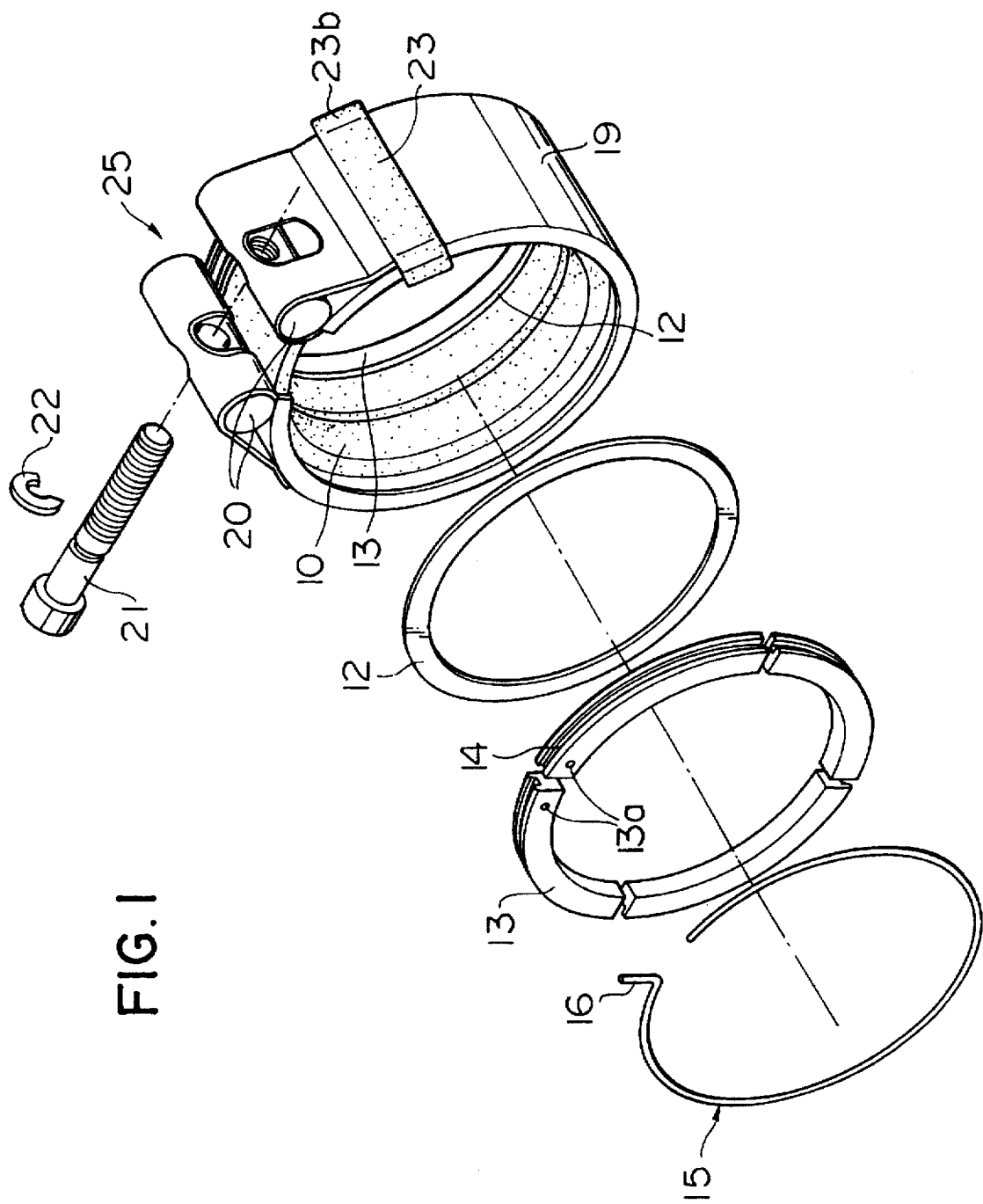
FIG. 1 is a fragmentary perspective view of the pipe joint according to the present invention.
Figure 2:
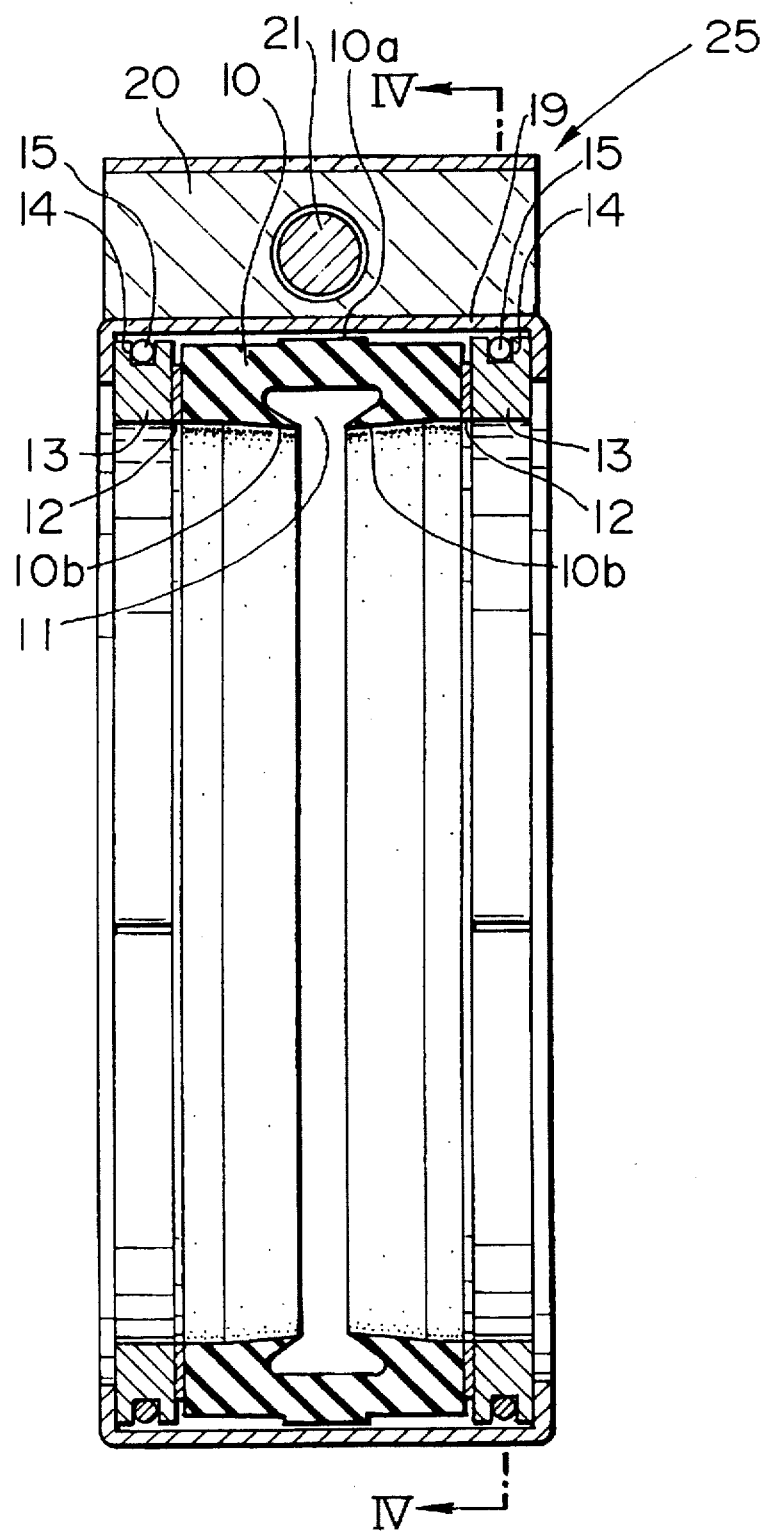
FIG. 2 is a cross-sectional view of the pipe joint taken lines A—A of FIG. 3, embodying a novel features of present invention.
Figure 3:
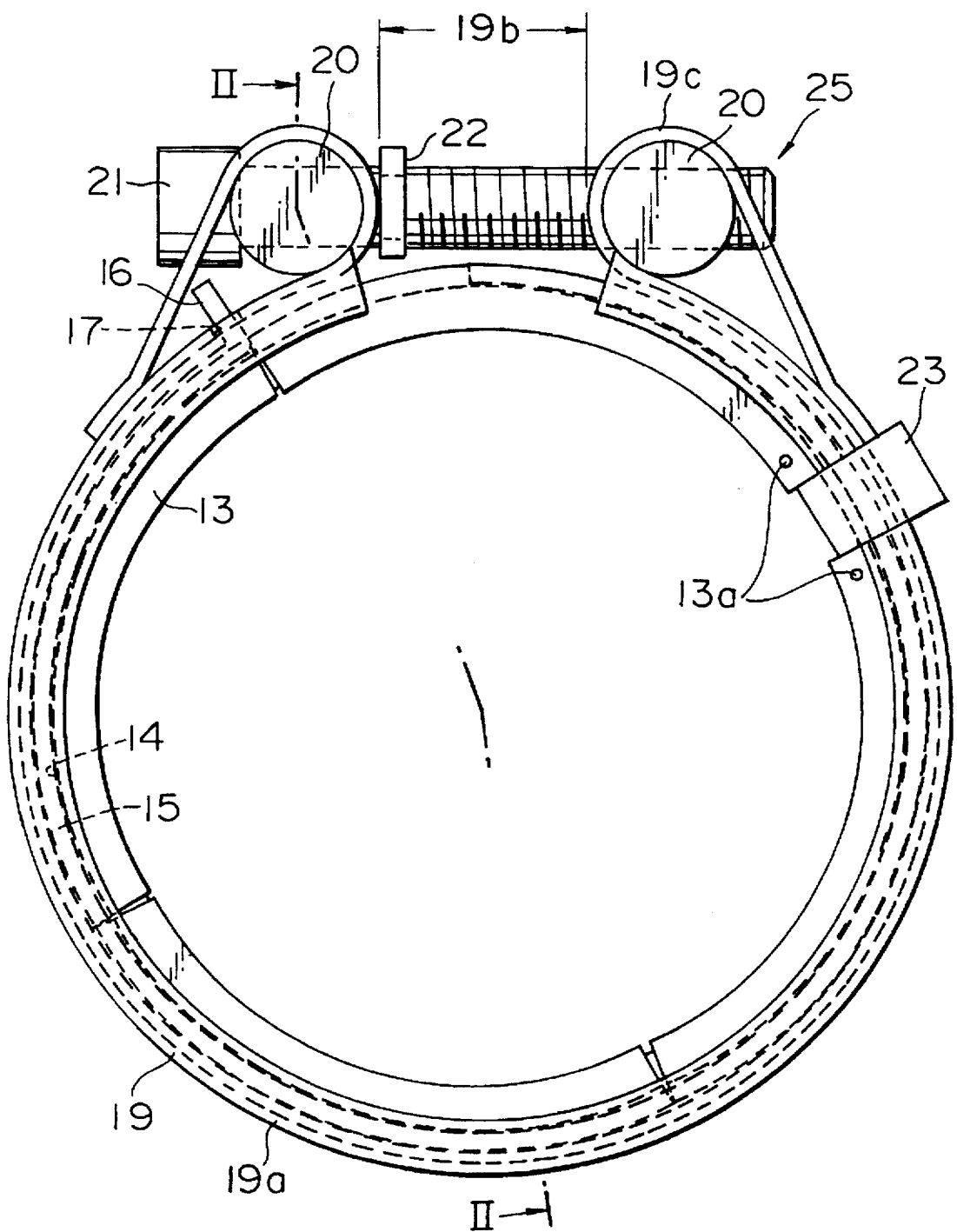
FIG. 3 is a right side view showing the pipe joint illustrated in FIG. 2.
Figure 4:
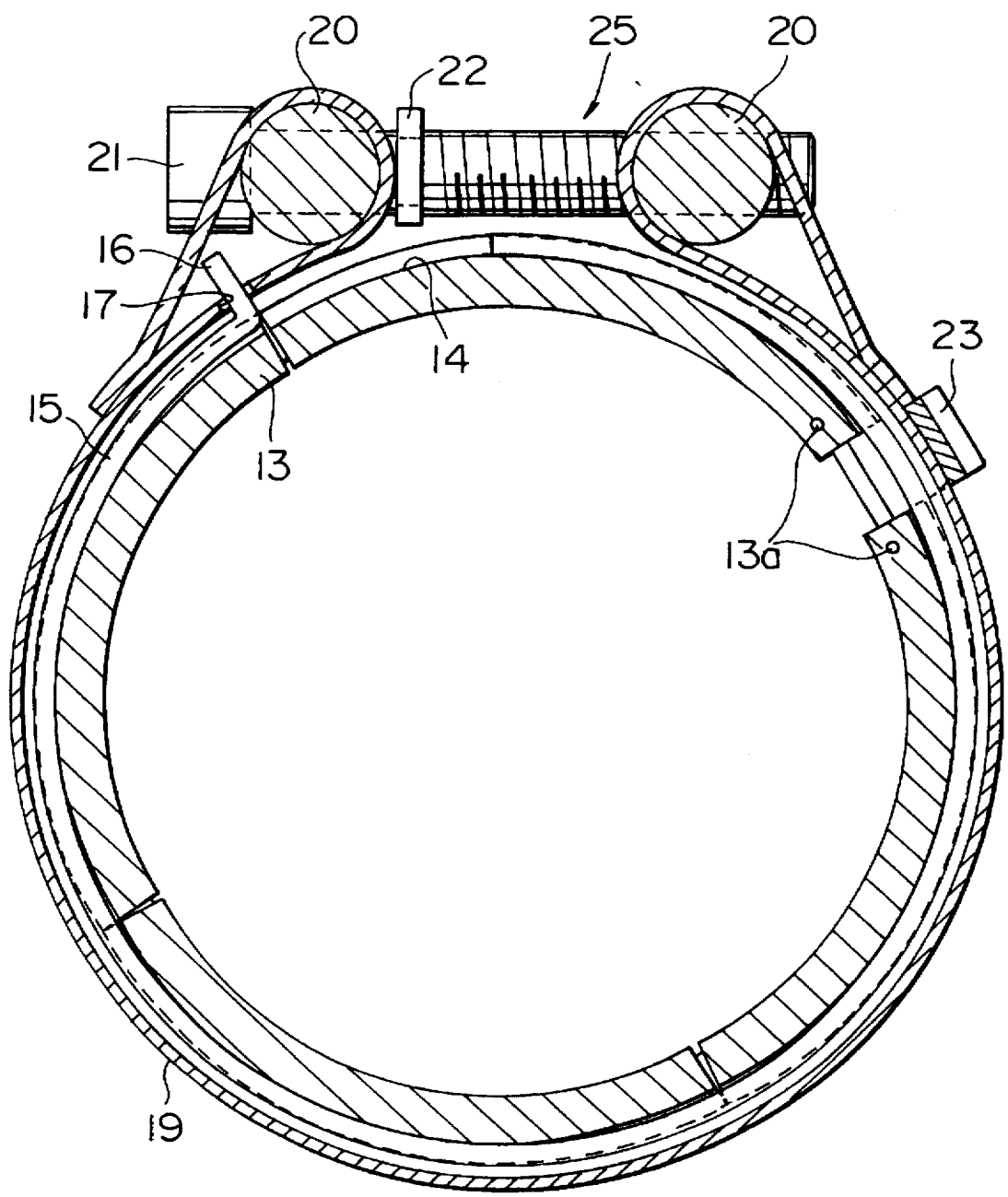
FIG. 4 is a cross-sectional view of parts of the pipe joint taken along line IV—IV shown in FIG. 2.

Preferred embodiments of a joint for pipes will be described in full detail in conjunction with the accompanying drawings.

As shown in the drawings for purposes of illustration, the present invention is embodied in the pipe joint particularly adapted for use in connecting a separated pipes such as may be used in water supply system.

The general arrangement in the fragmentary view of the pipe joint indicated generally at 25 in FIG. 1.

As shown in FIGS. 1-4, the pipe joint 25 comprises a circumferential seal ring 10 having opposite end holding ring 13 which adapted for sealing and connection to the separated pipes respectively.

The seal ring 10 is generally C-shaped in cross section and provide a lip portion 10b and 10b at inner circumference thereof that together surround the outside of the separated pipe and formed of a rubber having properties of gasket materials that is good resistance to water and other fluid.

To easily inserting and connecting the pipe joint to separated the seal ring 10 has a diameter of its inner circumference that is a slight larger dimensions than an outside diameter of the separated pipe.

The seal ring 10 has a convex portion 10a on its outer circumference which act as a compression transmission part for the diameter reducing of the seal ring 10.

To seal the separated pipes within the pipe joint 25, the seal ring 10 with the convex portion 10a is compressed inward to be embedded and sealed into the outer surface of the separated pipe.

Each slide washer 12 is rests between the seal ring 10 and the holding ring 13. Outside diameter of the slide washer 12 is slightly small dimension than outside diameter of the seal ring 10 and the holding ring 13, and inside diameter thereof is same dimension of inside diameter of the seal ring 10 and the holding ring 13.

This slide washer 12 allows smooth radial relative sliding between the seal ring 10 and the holding ring 13.

Each holding ring 13 is pluralized into quarter segment on circumference with the gap defined between each segment thereof, and provided with U-shaped outer groove 14 on their outer circumferences.

The surface of the groove 14 is provided with a ring spring 15 in form of C-shaped to compress inwardly each quarter segment of the holding ring 13.

Herein, the quarter segment is together in unity with the holding ring 13.

One end of the ring spring 15 has a turned up portion 16 for a insertion into a hole 17 of a holding housing 19.

Figure 5:
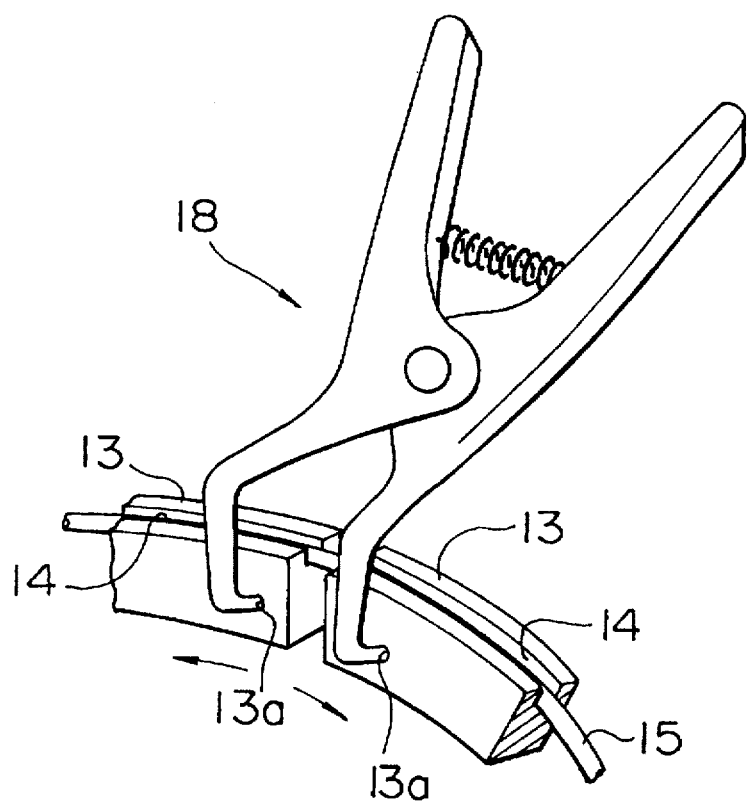
FIG. 5 is a partly sectional fragmentary perspective view of the pipe joint showing the position of enlargement of inside diameter of holding ring, and enlargement of a circumference clearance between holding ring segments provided may be used with a ring expander.

Pin hole 18a having a depth are provided with the holding ring 13 at side face of each two quarter segment, upper half quarter segment of the holding ring 13, includes a pair of oppositely arranged, and at adjacent to the center position thereof for insertion and removal of the expander 18 as shown in FIG. 5.

A holding housing 19 having band body 19a is generally flat channel shaped in cross section, surrounds the seal ring 10 and the holding ring 13, 13, and having an opening portion 19b between both end of the band body 19a. The end portion of the band body 19a is formed with a fix loop 19c that is bent turn outwards in a curve along a web section thereof which fix a rod member 20 within the fix loop 19c, respectively integral.

Each of rod member 20, 20 having a threaded opening that is positioned at right angle to the axial direction thereof, and a locking bolt 21 having thread is threaded into the opposite thread openings of rod member 20, 20.

The locking bolt 21 provide with a spacer portion 22 at the center position thereof to allow a secure locking of the holding housing 19 by threading of the locking bolt 21 until the spacer portion 22.

In use, firstly, the locking bolt 21 of the pipe joint 25 is sufficiently loosen to allowed diameter enlargement of the holding housing 19, accompanied with the holding ring 13, 13, and the pipe joint 25 is operative to permit easy insert and connection of the separating pipe 1, 1.

As shown in FIG. 5, the ring expander 18 is a tool alike a punch consisting of a pair of levers, a turn down portion are provided at one end thereof, and a handle portion at opposite end thereof.

As already mentioned above, in use, the turn down portion of the ring expander 18 are inserted into the pin hole 13a of the holding ring 13, and circumference clearance between adjacent segments of the holding ring 13, are enlarged manually as shown in arrow with the handle portion of used ring expander 18, thus allowed the diameter enlargement of the holding ring 13 against compress force of the ring spring 15.

Figure 6:
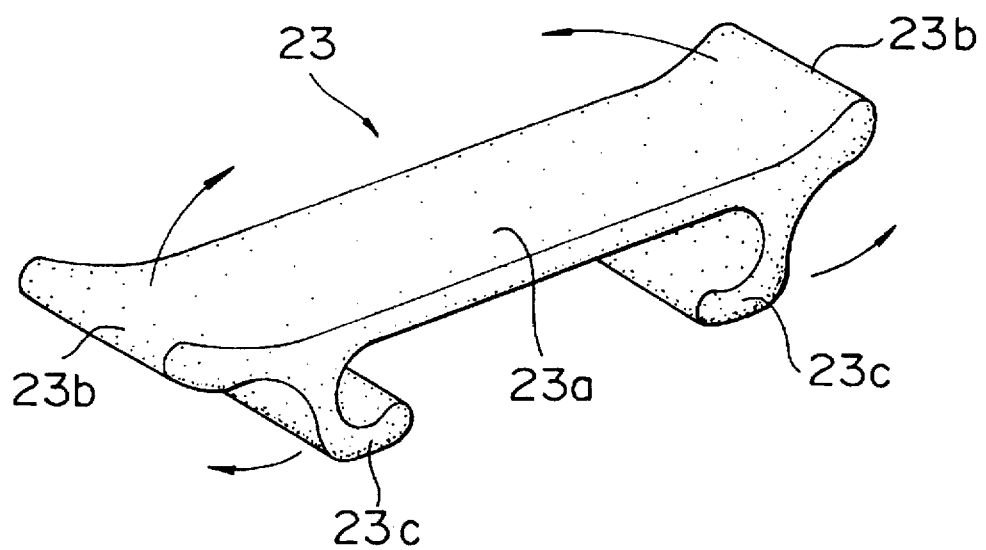
FIG. 6 is a perspective view of a clearance setting member of present invention.

In FIG. 6, the numeral 23 indicates an enlargement setting member for enlarged diameter setting of the holding ring 13, and may desirable be formed of flexible hard rubber.

Diameter enlargement of the holding ring 13 by the ring expander 18 produces the enlarged circumference clearance between adjacent segments of the holding ring 13, and the setting member 23 is inserted thereto, which is maintained the diameter enlargement of the holding ring 13 after removal of the ring expander 18.

The setting member 23 is in form of varied C-shaped.

The setting member 23 provide the flat plate portion 23a, end portion 23b and pair of spacing hook portion 23c on the opposite side of the flat plate portion 23a.

The width of the setting member 23 being approximately equal to the enlarged clearance between adjacent segments of the holding ring 13. According to the preferred embodiments of present invention, the setting member 23 is adapted to be partially wrapped around the holding housing 19, and pair of spacing hook 23c is inserted into the enlarged circumference clearance between the segments of the holding ring 13.

As a result, the enlargement of the space defined between the inside diameter of the holding ring 13, 13 and the outside diameter of the separated pipe be allowed.

The setting member 23 may be manually removed from the holding housing 19 accompanied with the holding ring 13, 13 under the moved position of the pipe joint 25 of FIG. 8 which is explain hereinafter.

As shown in FIG. 6, the flat plate portion 23a of the setting member 23 may be manually bend upwardly at both end portion 23b of the flat plate portion 23a as direction of the arrow, and the member 23 may be quickly removed from the holding housing 19.

When diameter enlargement of the holding ring 13, 13 are allowed to lock the pipe joint 25, the locking bolt 21 tightened within the thread openings of the rod members 20, 22.

Mating the treaded into the thread openings are to enable the locking bolt 21 to be threadably tightened onto the holding housing 19.

As already mentioned above, the turned up portion 16 of the ring spring 15 inserted into the hole 17 of the holding housing 19, and the quarter segment with U-shaped outer groove 14 that compressed inwardly with the ring spring 15 are together in unity with the holding ring 13.

Therefore, the holding ring 13 may be keep correctly in the specified position within the holding housing 19, and eliminate swell out outwardly from inside of the holding housing 19 to the axis of separated pipe. Additionally, a cirumference rotation of the ring spring 15 itself around the holding ring 13 be eliminated.

The opening portion of the ring spring 15 in form of C-shaped may be in the specified position within the holding housing 19, and allowed that the segment of the holding ring 13 may be in the specified position that the setting member 23 may be inserted thereto so that in effect a insertion of the setting member 23 is at ease of operation.

Figure 7:
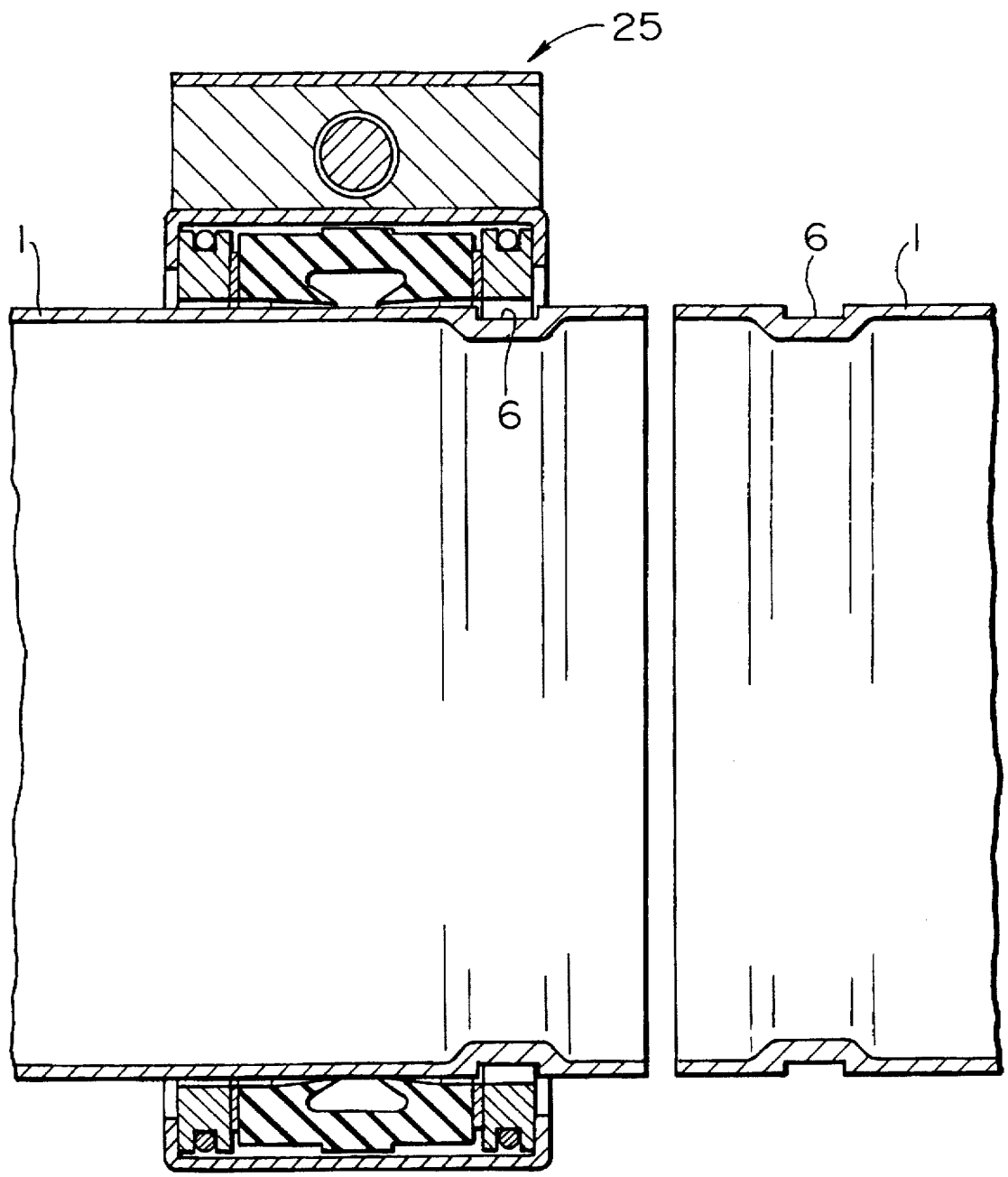
FIG. 7 is a cross-sectional view of the pipe joint illustrated in FIG. 2 showing the position of the pipe joint as one side of the separated pipe is initially inserted into the pipe joint.

As shown in FIG. 7 the pipe joint 25 illustrated in FIG. 1 is initially inserted into the outer surface of the one side of the separate pipe 1, and one of the holding ring 13 of the pipe joint 25 is located facing to the groove 6 at end of the outer surface of the separated pipe 1.

Under this initial position, as previously described, the pipe joint 25 is moved to permit smoothly inserted into the outer surface of one side of the separated pipe 1.

Figure 8:
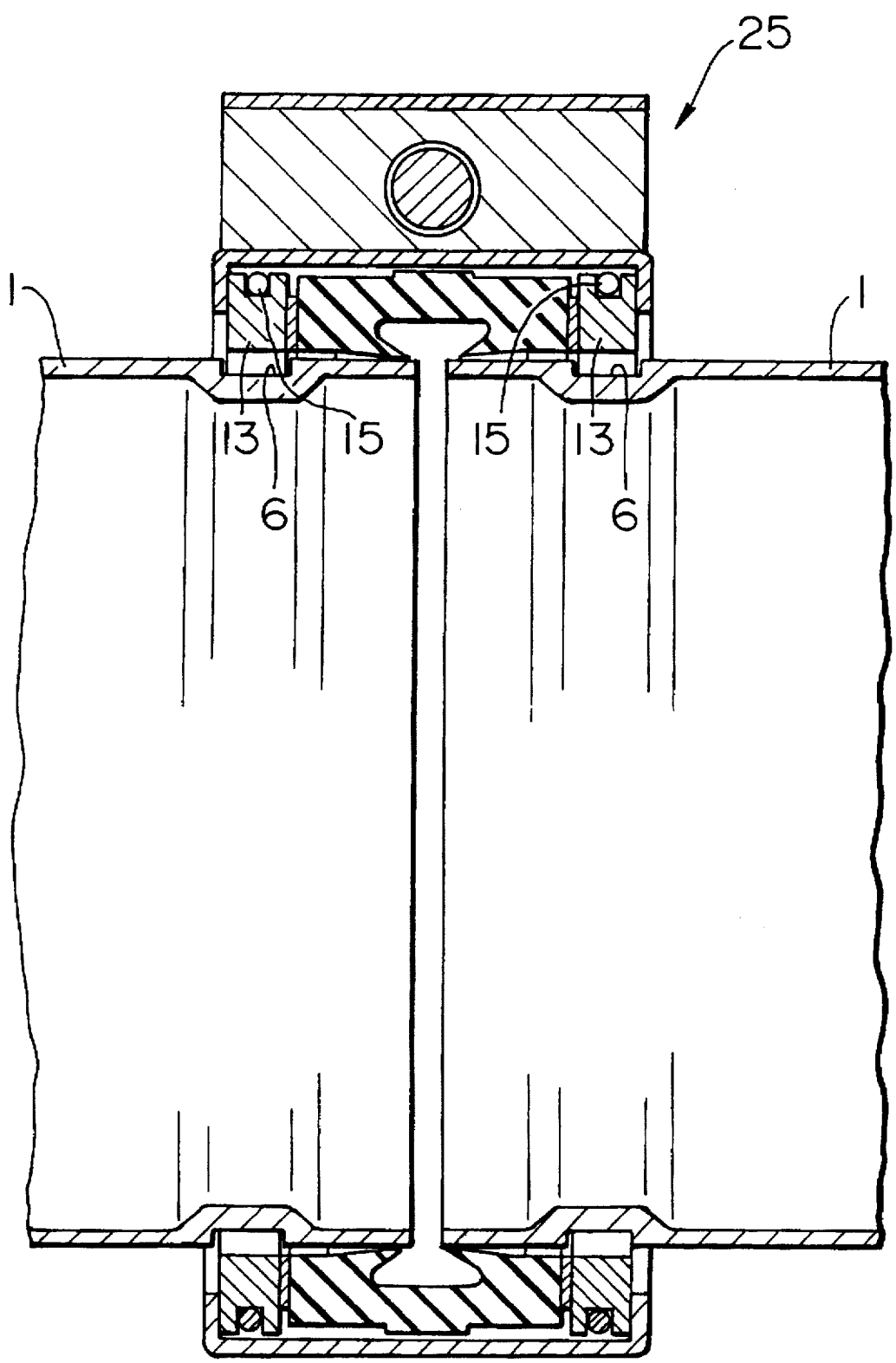
FIG. 8 is a cross-sectional view of the pipe joint illustrated in FIG. 2 showing the position of the pipe joint in moved positions to seal against the outside of the separated pipes and before being tightened down to seal against the outside of the separated pipes.

As shown in FIG. 8, the pipe joint 25 illustrated in FIG. 1 is in moved position that moved from the initial position thereof as illustrated in FIG. 7, to the outer surface of the other side of the separated pipe 1, and is inserted into the outer surfaces of the both side of the separated pipe 1, 1 and the position of each of the holding ring 13, 13 is located facing to the grooves 6, 6 at each of outer surface of the separated pipe 1, 1.

Under this moved position, as previously described, the pipe joint 25 is moved to permit smoothly inserted into each side of the separated pipe 1, 1, and the setting member 23 is removed from the holding housing 19.

As a result, the reduction of the space defined as previously described, the inside surface of each of the holding ring 13, 13 becomes fully positioned against the groove 6, 6, however, before being tightened down to seal against the outside of the separated pipe 1, 1.

Figure 9:
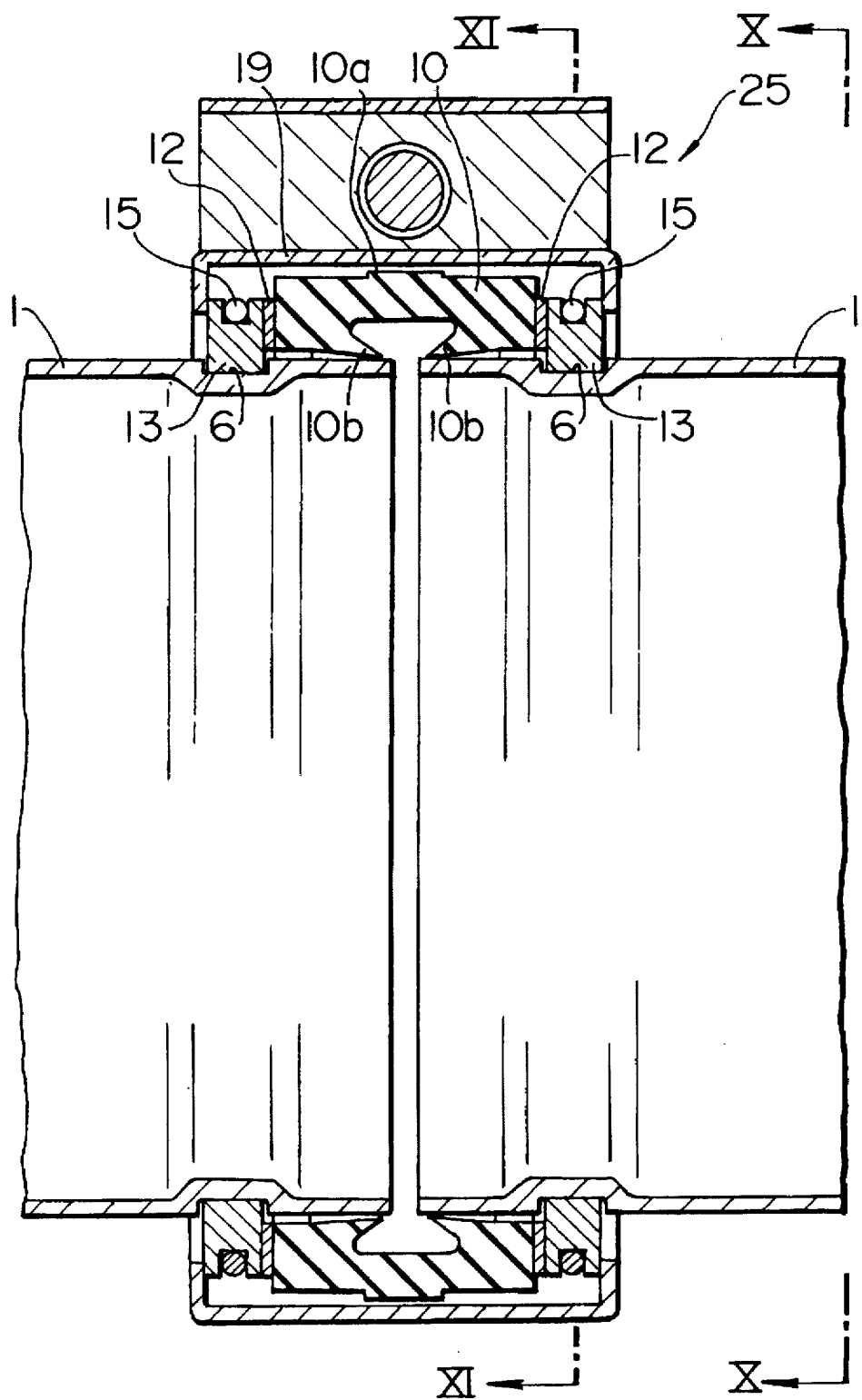
FIG. 9 is a cross-sectional view of the pipe joint illustrated in FIG. 2 showing the position of the pipe joint in engaged position to engage against the groove of the separated pipes, and before being tightened down to seal against the outside of the separated pipes.

As shown in FIG. 9, the pipe joint 25 illustrated in FIG. 1 is in engaged position that each of the holding ring 13, 13 of the pipe joint 25 is positioned to engage against the groove 6, 6 at each of outside of the separated pipe 1.

Figure 10:
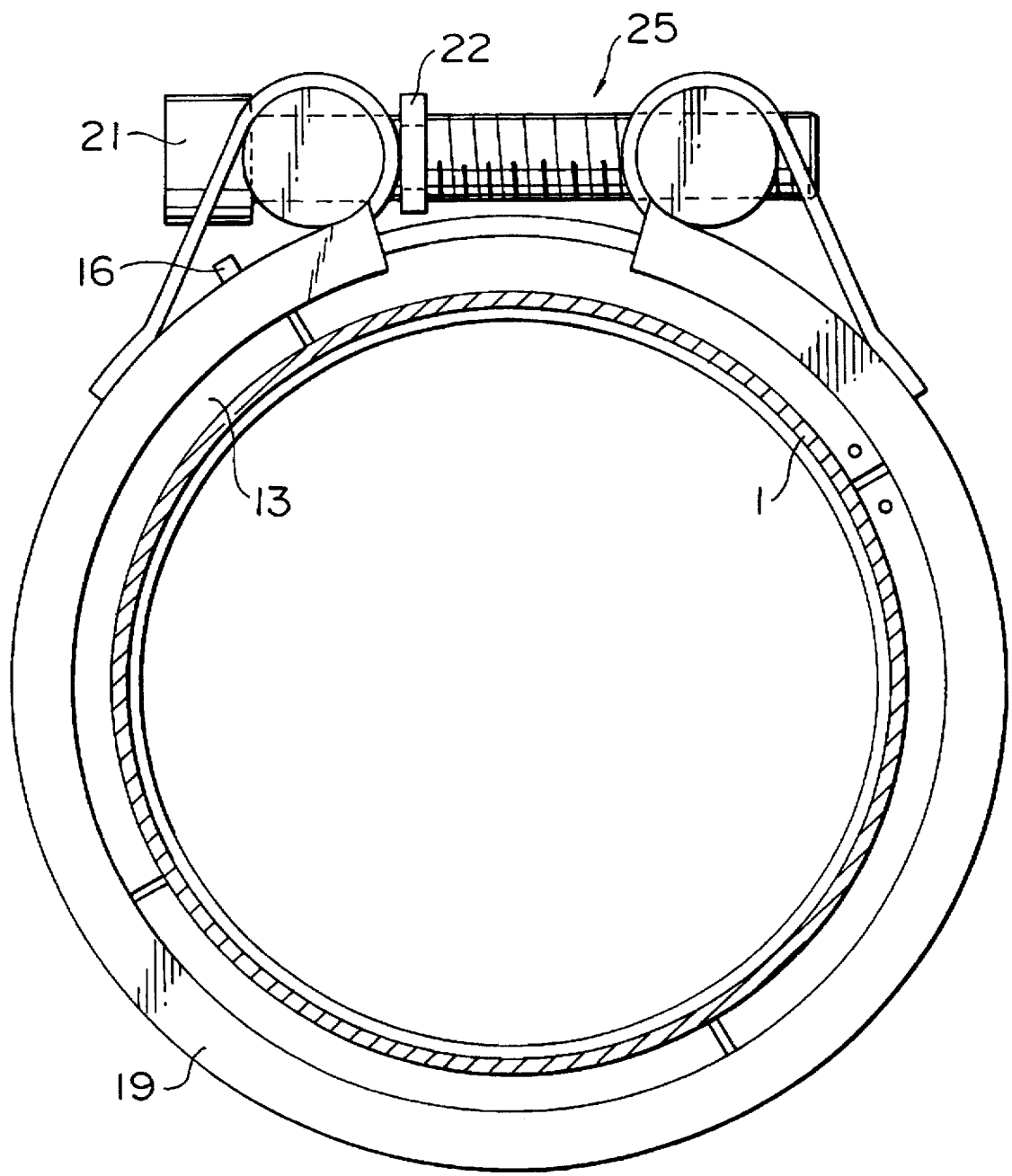
FIG. 10 is a cross-sectional view taken along lines X—X of FIG. 9.
Figure 11:
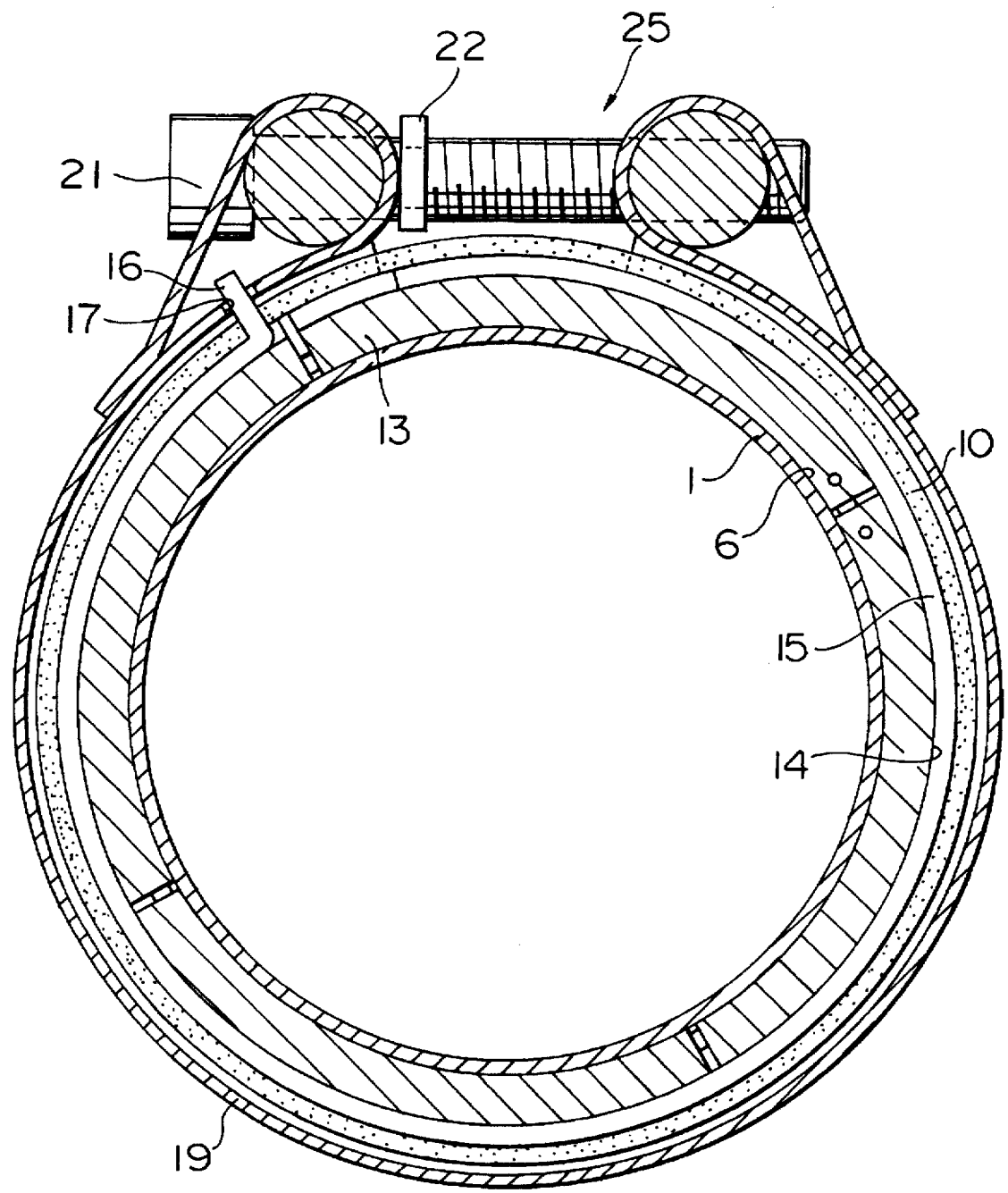
FIG. 11 is a cross-sectional view taken along lines XI—XI of FIG. 9.

Referring to FIGS. 10 and 11 the pipe joint 25 is in the engaged position that will be seen by referring to FIG. 9.

Figure 12:
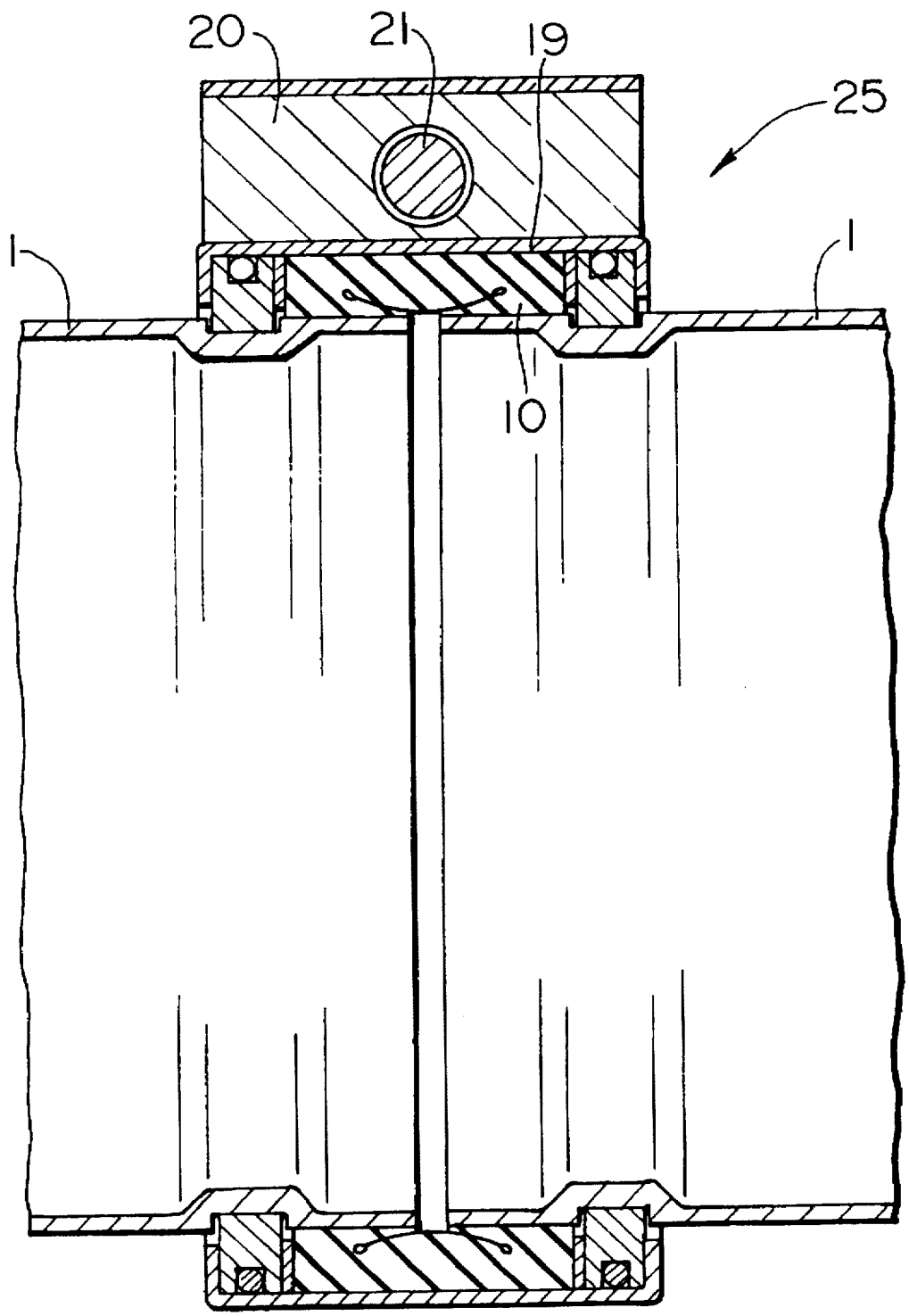
FIG. 12 is a cross-sectional view of the pipe joint illustrated in FIG. 2 showing the position of the pipe joint in sealed position to seal against the outside of the separated pipe and being tightened down to seal against the outside of the separated pipes.
Figure 13:
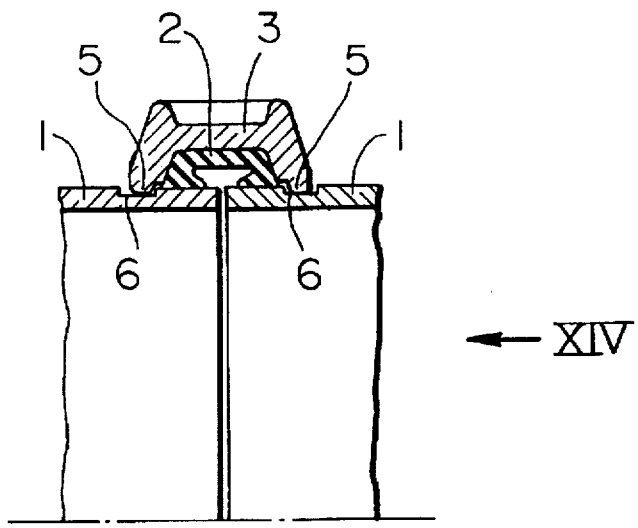
FIG. 13 is a side view taken along lines XIII of FIG. 14 according to prior art.
Figure 14:
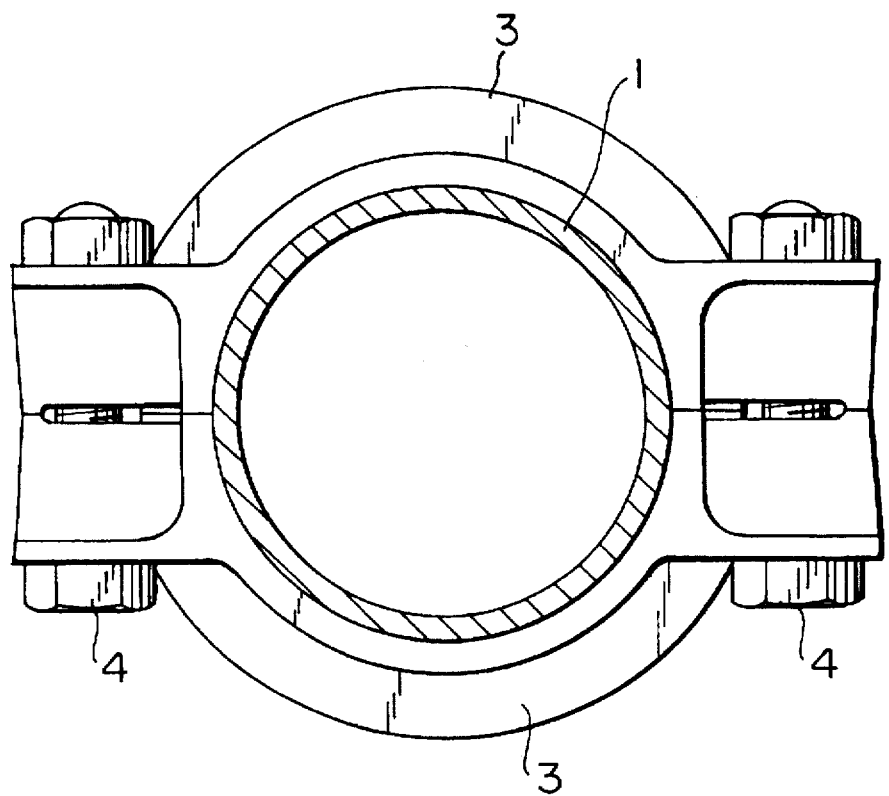
FIG. 14 is a partial cross-sectional view of a pipe joint according to prior art.
Figure 15A:
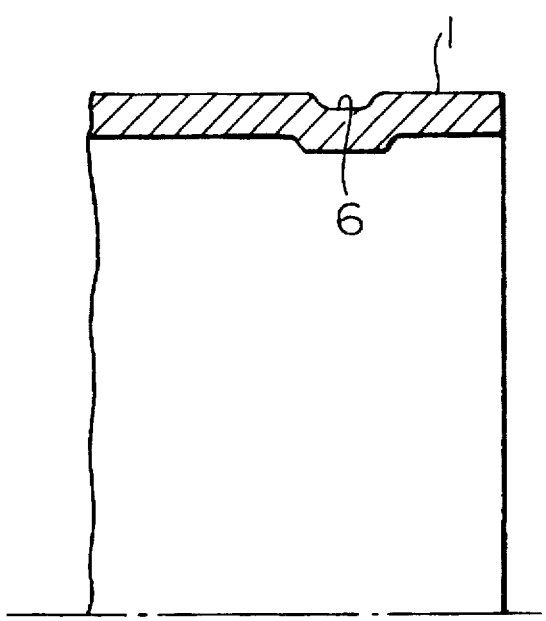
FIG. 15A is a partial cross-sectional view of a pipe joint showing a groove at each end surface of separated pipe according to prior art.
Figure 15B:
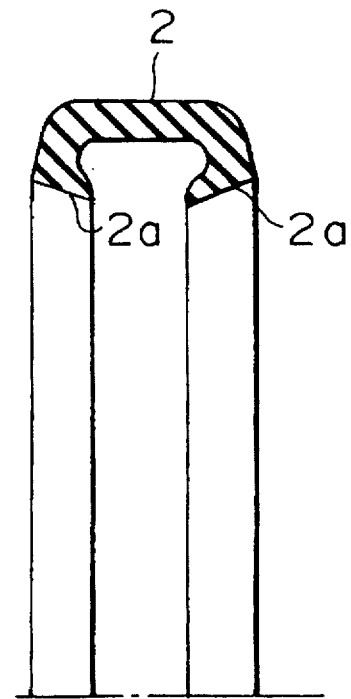
FIG. 15B is a partial cross-sectional view of a pipe joint showing a seal ring according to prior art.

As shown in FIG. 12, the pipe joint 25 is finally in sealed position being tightened down to that is the normal operating condition. Each of the holding ring 13, 13 embedded within the groove 6,6 and to seal against the outside of the separated pipe 1, 1, thereby, the separated pipe 1 and 1 are connected.

In this sealed position, the band body 19a of the holding housing 19 is tightened by threading of the locking bolt 21 until the spacer portion 25 into the opposite opening of the rod member 20, 20. Then the holding ring 13, 13 is completely tightened down to embedded within the groove 6, 6 of the outside of the separated pipe 1, 1.

For sealing against the outside of the separated pipe 1, 1 within the pipe joint 25, the convex portion 10a of the seal ring 10 is pushed radially inwardly to squeeze the seal ring 10 that together surround the opening between both end of the separated pipe 1, 1 and the lip portion 10b and 10b as an annular sealing surface formed on the inside surface of the sealing ring 10 embedded within outside surface of both end of the separated pipe 1, 1, thereby, eventually making the pipe joint for connecting the separated pipes together, and used for a leakage proof fluid flow in the water or other fluid supply system.

As an added feature, however, the holding ring 13, 13 of the pipe joint 25 serves as a stop engageable into the groove 6, 6 at the outside of the separated pipe 1, 1, and hold the separated pipe 1, 1 within the pipe joint 25, and resist an axial force along the axial direction of the separated pipe 1, 1, and against to separate the pipe joint 25 and the separated pipe 1, 1.

In regard to assemble the pipe joint 25, an incorrect inserting or lack of the tightening of the holding housing 19 may be cause water leakage from the pipe joint 25.

Further, regardless of the tightening of the holding housing 19 into the separate pipe is provided, if nothing is placed in engagement of the holding ring 13, 13 against the groove 6, 6 may be cause similarly water leakage from the pipe joint 25.

In such a situation, the operator may be recognize the incorrect assembling of the pipe joint 25.

Thus, it is seen from the foregoing that present invention brings to the art a unique substantially pipe joint 25 which is particularly adapted for easily connecting the separated pipe 1 and 1 in a water supply system.

Advantageously, this is achieved in the exemplary embodiment through the use of the holding ring which is comprised of the uniquely shaped divided segments thereof which enable use of the ring spring for complete tightening to engage within the groove and against separation from the separated pipes, further, the ring spring be eliminate swell out of the holding ring from inside of the holding housing, and eliminate circumference rotation by itself.

Furthermore, the ring expander in the exemplary embodiment is an advantageous feature that is capable of fitting into the pin hole of the holding ring that create enlargement of circumference clearance between adjacent segment of the holding ring, thus, allowed the diameter enlargement of the holding ring 13 against compress force of the ring spring 15.

The setting member in the exemplary embodiment is an advantageous feature that is capable of maintaing the diameter enlargement of the holding ring after removal of the ring expander, and is at ease of prior to installing operation of the pipe joint.

Further, the embodiment of the pipe joint has the advantage of additional simplicity and expense of the pipe joint disconnection from the separated pipes.

The pipe joint disconnection from the separated pipes is allowed in contrast with connecting the separated pipes together.

In the case of the pipe joint disconnection as required, the locking bolt 21 of the pipe joint is sufficiently loosen to allow diameter enlargement of the holding housing 19, the ring expander 18 allowed the enlargement of circumference clealance between adjacent segments of the holding ring 13, 13 and the setting member 23 is inserted into above circumference clearance, thus, the enlargement of the space defined between the inside diameter of the holding ring 13, 13 and the outside diameter of the separated pipe be allowed at ease of operation Of additional advantage is that the present invention enables easily recognizing the correct alignment of the pipe joint, thereby eventually making the pipe joint itself superflows as fluid leakage without operator awareness would be prevented.

While the invention has been described with regards to the preferred embodiment, it is recognized that the present invention may be devised which would not depart from the scope of the present invention.

What is claimed is:

1. In a pipe joint having an annular sealing ring with oppositely disposed end portions and a flow passage extending therethrough along a central axis of the annular sealing ring, said sealing ring having means to reduce its diameter, said sealing ring having means for tightening and compressing sealingly against the outside of axially aligned separated pipe ends inserted therein, the improvement in the annular sealing ring of the pipe joint comprising:

an annular flexible compressible ring having a lip portion constructed to bridge separated end portions of the aligned ends of two pipes of generally like diameter;

a segmented annular ring disposed axially at each side of said flexible compressible ring for engaging grooves in the pipe ends;

said segmented annular rings having a groove facing outwardly circumferentially;

said grooves of said segmented annular rings having an annular spring means to draw said segments together to thereby decrease the diameter of said segmented annular rings;

a band body of said annular sealing ring having two end portions and being radially inwardly facing U-shaped in cross section, said band body being wrapped about said compressible ring and said segmented annular rings;

each of said end portions of said band body being looped about horizontally displaced members;

each of said members having threaded aligned holes therethrough, each of said horizontally displaced members being connected by a threaded screw means constructed to draw said members together when rotated in one direction and to move said members apart when rotated in the other direction to move said end portions of said band together or apart to thereby tighten or loosen said band about said compressible ring and urge or release said compressible ring about the separated end portions of said pipes;

a segmented annular ring widening means for enlarging the internal diameter of said segmented annular ring, said widening means being removably interposed between pin holes at each side of at least two adjacent said segmented annular rings.

2. The pipe joint according to claim 1 wherein there is included an annular slide washer at each side of said compressible ring and interposed between said compressible ring and each of said segmented annular rings;

said slide washer having a bore diameter essentially the same as the inner diameter of the compressible ring and a bore diameter essentially the same as the inner diameter of the segmented annular ring, said slide washer having an outer diameter less than the outer diameter of the compressible ring and less than the outer diameter of the segmented annular ring.

3. The pipe joint according to claim 1 wherein said compressible ring being generally C-shape in cross section, and formed of a rubber having properties of a gasket material, said compressible ring having a radially extending convex portion having a larger diameter than the outer diameter of the compressible ring and is positioned internally of said band for transmitting a compressive force to said compressible ring when said band body is reduced in diameter.

* * * * *

UNITED STATES PATENT AND TRADEMARK OFFICE
CERTIFICATE OF CORRECTION

PATENT NO. : 5,722,695
DATED : Mar. 3, 1998
INVENTOR(S) : Matsumoto et al.

It is certified that error appears in the above-identified patent and that said Letters Patent is hereby corrected as shown below:

column 8, line 42, after "extending" delete -- convex --.

Signed and Sealed this

Fifteenth Day of June, 1999

Attest:

Q. TODD DICKINSON

Attesting Officer

Acting Commissioner of Patents and Trademarks